Nov. 14, 1939.  P. M. BASTUSCHECK  2,180,272
TRAILER HITCH
Filed Aug. 5, 1937  2 Sheets—Sheet 1

INVENTOR.
Paul M. Bastuscheck
BY
ATTORNEYS.

Nov. 14, 1939.   P. M. BASTUSCHECK   2,180,272
TRAILER HITCH
Filed Aug. 5, 1937   2 Sheets-Sheet 2
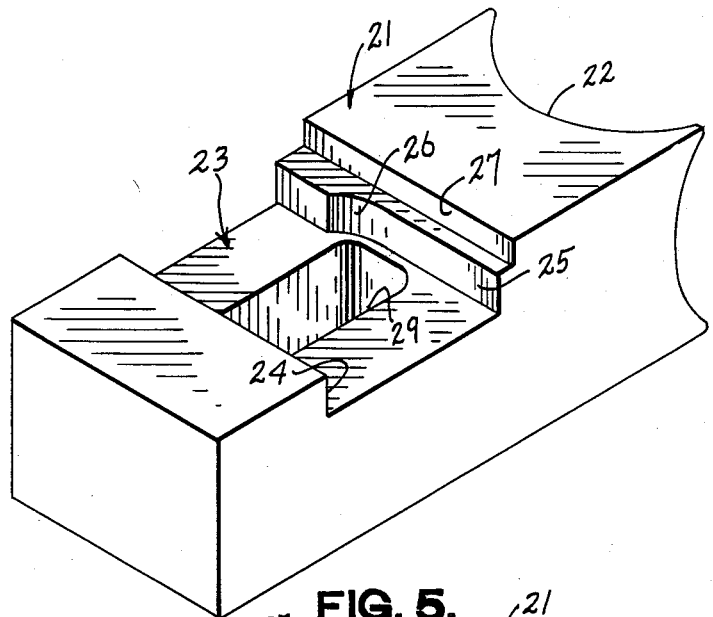
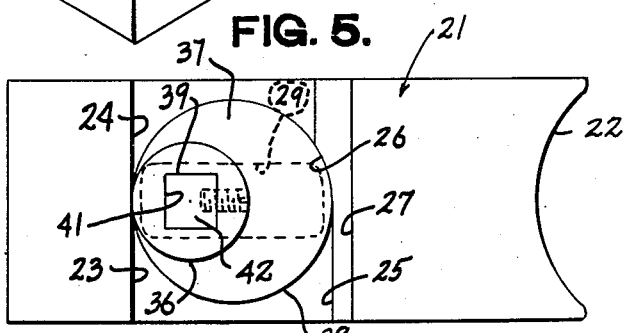
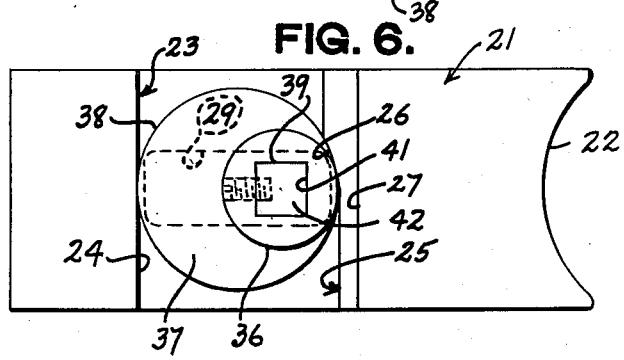
INVENTOR.
Paul M. Bastuscheck Patented Nov. 14, 1939

2,180,272

UNITED STATES PATENT OFFICE 2,180,272

TRAILER HITCH

Paul M. Bastuscheck, Hazleton, Pa.

Application August 5, 1937, Serial No. 157,615

5 Claims. (Cl. 280—33.15)

The present invention relates to couplings and more particularly to improvements in draft couplings generally referred to as trailer hitches, for releasably securing a trailer to an automobile or other draft vehicle.

Danger to life and property is great due to the possibility of uncoupling of trailer hitches when the vehicles connected by the hitch are in motion or at rest upon a steep grade. It is the primary object of this invention to provide an improved trailer hitch provided with a lock for securing the vehicles connected by the hitch in positively coupled relation.

Another object of the invention is to provide an improved trailer hitch provided with a lock and so constructed as to prevent positive coupling of the trailer to an automobile or other draft vehicle by an unauthorized person.

Still another object is to provide a trailer hitch having a detent reciprocable between a coupling position and an uncoupling position and which may be locked in either of said positions.

A further object is to provide a trailer hitch having a control handle which may not be removed when the hitch is locked in either of said positions.

A still further object of the invention is to provide a trailer hitch wherein any forward thrust of the trailer toward the automobile or other draft vehicle, such as results upon the application of the brakes of the forward vehicle, is transmitted directly through a relatively few parts of the hitch, and not through the control handle or its shaft.

Yet another object of the invention is to provide a trailer hitch having a detent reciprocable between a coupling position and an uncoupling position by means of an improved cam and slot arrangement, and wherein the slot is so shaped as to limit movement of the detent between said positions.

A further and important object is to provide a trailer hitch including a ball and a socket formed in part by a reciprocable detent for releasably engaging a major portion of the surface of the ball.

Other objects and advantages of the invention will become apparent during the course of the following detailed description, taken in connection with the accompanying drawings, forming a part of this specification, and in which drawings:

Figure 4 is an isometric perspective view of the detent showing the formation of the camway thereof.

Figures 5 and 6 are inverted plan views, respectively, showing the relative positioning of the cam and detent when the detent is in its projected and retracted positions.

Figure 1:
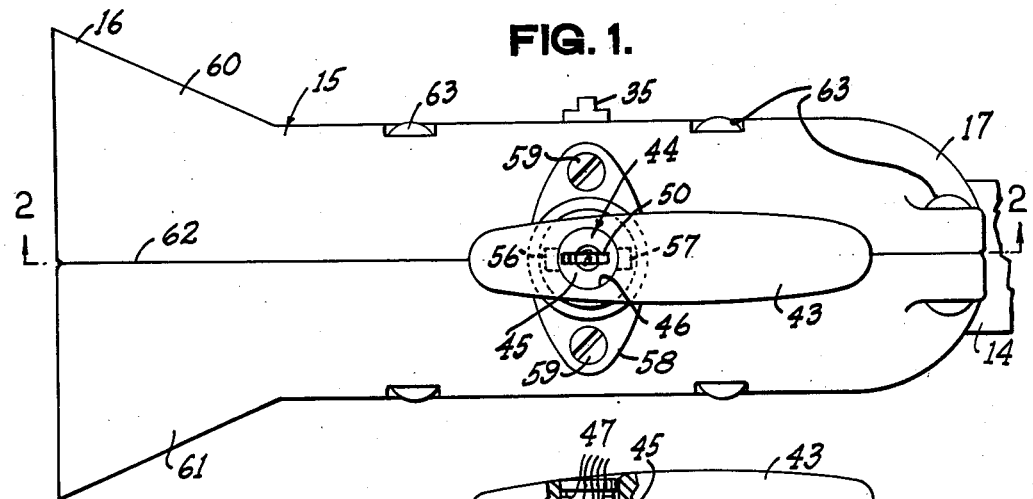
Figure 1 is a top plan view of the improved trailer hitch and showing the control lever or handle locked in a position securing the hitch in coupled relation.

In the drawings, wherein for the purpose of illustration is shown only a preferred form of the invention, and wherein similar reference characters denote like parts throughout the several views, 10 designates a ball or head carried at the upper end of a vertical rod or standard 11 provided with a flange 12 and secured, as by a rivet head 13, to a bar or other draft member 14 which may be connected in any suitable manner to the automobile or other draft vehicle (not shown). An elongate housing 15, which may be secured at its rear end 16 in any suitable manner to the trailer (not shown) is provided at its forward end 17 with a concave semi-spherical partial socket 18 extending upwardly from a circular mouth 19 in the bottom of the housing and of a diameter to permit passage of the ball into and out of the partial socket. Intermediate its ends, the housing is provided with a longitudinal interior guideway 20, of rectangular shape in cross-section, communicating at its forward end with the partial socket. Slidably mounted for rectilinear reciprocating movement in the guideway toward and away from the partial socket is a detent 21 provided with a concave spherically curved forward end 22 adapted, when the detent is moved toward the partial socket, to form a continuous concavely spherical socket adapted to engage a major portion of the surface of the ball and whereby to prevent movement of the ball into or out of the socket. Across the bottom side of the detent and transversely of its path of reciprocating movement, a groove or camway 23 is provided, including spaced apart sidewalls 24—25, parallel to each other from one side of the detent to substantially its longitudinal center, the sidewall 25 including an arcuate portion 26 converging toward the sidewall 24 beyond the longitudinal center of the detent. The curvature of the portion 26 may be determined by an arc having its center in the longitudinal center of the detent and its radius equal to half the distance between the parallel portions of the sidewalls. If desired, the forward end of the detent may be of increased depth forming a downwardly projecting wall or shoulder 27, accommodated in an appropriately enlarged step 28 in the guideway. Extending vertically through the detent above the groove or camway 23 is an elongate slot 29, disposed longitudinally of the path of movement of the detent. Interiorly of the lower wall 30 of the housing and communicating with the guideway is a vertically disposed cylindrical seat 31 in axial alignment with a cylindrical opening or bearing 32 extending through the upper wall 33 of the housing. Extending radially outwardly of the seat 31 to the exterior surface of the housing is a passageway 34 preferably closed by a removable cap 35.

Rotatably mounted in the seat 31 and corresponding in size thereto, is a cylindrical collar portion 36 of an eccentric 37 having a circular disc or cam portion 38 engaging the groove of the detent in sliding tangential relation to the sidewalls 24—25. Secured at the squared end 39, as by removable threaded pin or setscrew 40, in the squared axial opening 41 of the eccentric is a rockshaft 42, extending through the slot 29 in the detent, and also through the bearing opening 32, and provided exteriorly of the housing with an operating crank or handle 43. Turning of the handle 43 in either direction will bring the cam portion 38 of the eccentric into contact with the arcuate wall 26, whereby to limit rocking movement of the rockshaft between angular positions one half turn apart. The shape of the cam portion 38 is such that a half turn of the rockshaft when the detent is positioned away from the socket will move the detent from its rearward limit of reciprocating movement to its forward limit of reciprocating movement in which position movement of the ball into or out of the socket is prevented.

Any suitable means 44 may be provided to releasably lock the rockshaft against rotation when the rockshaft is in either of its limited positions whereby to secure the detent in its forward or engaging position, or in its rearward or disengaging position. In the example shown, a rotatable plug 45 is disposed within an axial bore 46 at the handle end portion of the rockshaft and is provided with a series of locking discs 47 normally projecting into one of a pair of oppositely disposed grooves 48—49 in the axial bore. The discs may be retracted from either of said grooves by inserting a suitable key (not shown) into the keyway 50 in the usual manner, whereby to permit rotation of the plug. Tangentially positioned in an annular groove 51 of the plug is a crosspin 52 carried by the rockshaft and holding the plug against axial movement. At its inner end 53, the plug is provided with a crankpin 54 adapted, when the plug is rotated to a position wherein the locking discs 47 align with the groove 48, to project a dog 55 into engagement with one of a pair of oppositely spaced notches 56—57 in an escutcheon plate 58 surrounding the rockshaft and fixed to the housing as by screws 59, so as to secure the rockshaft against rotation. When the plug is rotated to a position wherein the locking discs 47 align with the groove 49, the crankpin 54 retracts the dog 55 from locking engagement with the escutcheon plate and retains the dog wholly within and diametrically of the rockshaft so as to permit turning of the rockshaft.

The housing 15 may, if desired, be produced by casting in two symmetric halves 60—61, at opposite sides of the central vertical longitudinal plane 62 of the housing, and after positioning the eccentric 37 and the detent 21 therein, the opposite halves may be permanently united as by rivets 63. The squared end 39 of the rockshaft may then be positioned in the squared opening 41 of the eccentric, so that, after securing the escutcheon plate 58 to the housing as by the screws 59, the eccentric may, with the rockshaft unlocked, be turned to a position permitting access through the passageway 34, whereby the threaded pin or setscrew 40 may be turned to fasten the rockshaft within the eccentric. The passageway 34 is so disposed intermediate the locking positions of the rockshaft that access to the setscrew 40 is prevented upon locking of the rockshaft.

Figure 2:
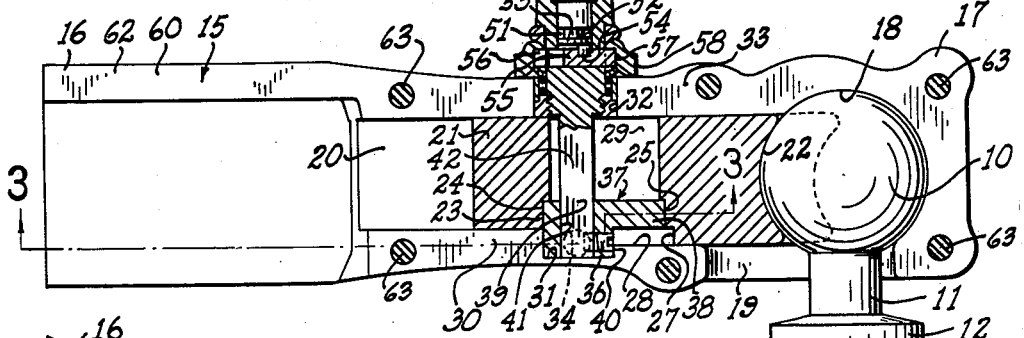
Figure 2 is a longitudinal vertical sectional view substantially on line 2—2 of Figure 1 and showing the relationship of certain parts when the hitch is locked in its coupled position.
Figure 3:
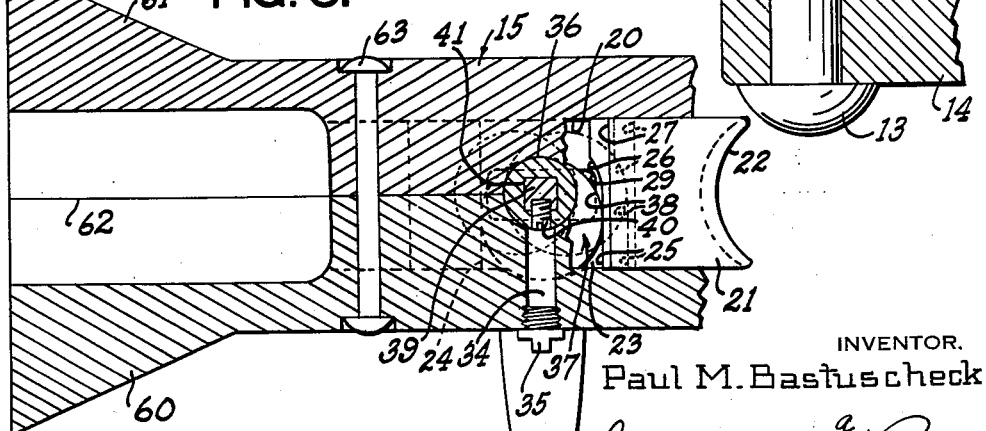
Figure 3 is an inverted horizontal fragmentary sectional view substantially on the line 3—3 of Figure 2, and showing the relationship of certain parts when the control handle is unlocked and disposed intermediate the positions assumed by the handle for coupling and uncoupling the hitch.

In the operation of the trailer hitch, and assuming the position of parts to be as shown in Figures 1 and 2, upon the insertion of a proper key in the keyway 50, the discs 47 are retracted from the groove 48 to unlock the plug 45 which may then be rotated one half turn so that the discs 47 align with the groove 49. Such rotation retracts the dog 55 from the notch 57 to unlock the rockshaft from the escutcheon plate 58, so that the rockshaft may be given a half turn in a counterclockwise direction to move the detent 21 away from the socket 18 whereby the ball 10 may be removed. If desired, the detent may be locked in its disengaged position remote from the socket by returning the plug 45 so that the discs 47 are brought into alignment with the groove 48. This will project the dog 55 into the opposite notch 56. Obviously, the handle may first be returned so as to bring the detent back to its forward position, prior to turning the plug 45, thereby locking the rockshaft through projection of the dog into the notch 57. It will thus be seen that an improved trailer hitch is provided having a lock for preventing coupling or uncoupling of the hitch either accidentally or by an unauthorized person.

Various changes may be made in the form of invention herein shown and described without departing from the spirit of the invention or the scope of the following claims.

I claim:

1. In a trailer hitch, a housing having a socket, a head movable into and out of the socket, a detent slidably mounted for rectilinear reciprocating movement in the housing toward and away from the socket to lock and unlock the head against movement into or out of the socket, said detent having a groove including spaced parallel side walls forming a camway extending transversely of the path of movement of the detent, a rockshaft carried by the housing and having an operating lever, a circular cam in the housing eccentrically mounted for rocking movement with the rockshaft and tangentially engaging the side walls of the camway for imparting said rectilinear reciprocating movement to the detent, said camway including an abutment wall disposed in the path of rocking movement of the cam so as to limit movement of the cam in either direction.

2. In a trailer hitch, a housing having a socket, a head movable into and out of the socket, a detent slidably mounted for rectilinear reciprocating movement in the housing toward and away from the socket to lock and unlock the head against movement into or out of the socket, said detent having a face provided with a groove including spaced sidewalls forming a camway extending transversely of the path of movement of the detent, a rockshaft carried by the housing and having an operating lever, a circular cam in the housing eccentrically mounted for rocking movement with the rockshaft and slidably engaging the spaced sidewalls of the camway for imparting said rectilinear reciprocating movement to the detent, said camway including an abutment wall disposed in the path of rocking movement of the cam so as to limit movement of the cam in either direction, and means releasably securing the cam in either of said limited positions.

3. In a trailer hitch, a housing having a socket, a head movable into and out of the socket, a detent mounted for reciprocating movement in the housing toward and away from the socket to respectively secure the head against and release the head for movement into and out of the socket, a rockshaft in the housing, a crank for the rockshaft exteriorly of the housing, an eccentric on the rockshaft, a removable pin securing the eccentric to the rockshaft, said eccentric so engaging the detent that rocking movement of the rockshaft between two angularly spaced positions imparts said reciprocating movement to the detent whereby when the rockshaft is disposed in one of said positions, the head is secured against movement into or out of the socket, and in the other of said positions, the head is free to move into or out of the socket, the housing being provided with an opening aligning with and permitting removal of the pin when the rockshaft is in an angular position intermediate said two angularly spaced positions, and a lock releasably securing the rockshaft against rotation when the rockshaft is in either of said two angularly spaced positions.

4. In a trailer hitch, a housing having a socket, a head movable into and out of the socket, a detent mounted for reciprocating movement in the housing toward and away from the socket to respectively secure the head against and release the head for movement into and out of the socket, a rockshaft in the housing, a crank for the rockshaft exteriorly of the housing, an eccentric on the rockshaft, a removable pin securing the eccentric to the rockshaft, said eccentric so engaging the detent that rocking movement of the rockshaft between two angularly spaced positions imparts said reciprocating movement to the detent whereby when the rockshaft is disposed in one of said positions, the head is secured against movement into or out of the socket, and in the other of said positions, the head is free to move into or out of the socket, the housing being provided with an opening aligning with and permitting removal of the pin when the rockshaft is in an angular position differing from at least one of said two angularly spaced positions, and a lock releasably securing the rockshaft against rotation when the rockshaft is in at least one of said two angularly spaced positions.

5. A coupling of the class described comprising a housing having a socket and a guideway interiorly of the housing communicating with the socket, a head insertable into and withdrawable from the socket, a detent slidably mounted for reciprocating movement in the guideway toward and away from the socket for respectively securing the head against and releasing the head for insertion into and withdrawal from the socket, said detent having an elongate slot, an eccentric having a collar seated in one side wall of the housing and having a cam portion so engaging the detent as to impart said reciprocating movement thereto upon rocking movement of the eccentric, and a rockshaft extending through the slot in the detent and having one end portion fixed in the collar, the other end portion of the rockshaft extending through the opposite side wall of the housing and being provided with a crank exteriorly of the housing.

PAUL M. BASTUSCHECK.